United States Patent
Ellis et al.

(10) Patent No.: US 10,438,620 B1
(45) Date of Patent: Oct. 8, 2019

(54) SERVO ZONE TRANSITION OPTIMIZATION FOR MAGNETIC DISK RECORDING DEVICES

(71) Applicant: SEAGATE TECHNOLOGY LLC, Cupertino, CA (US)

(72) Inventors: Timothy Francis Ellis, Tonka Bay, MN (US); Gary Ernest Hillukka, Cokato, MN (US); Joshua Ward Christensen, Savage, MN (US); Puskal Prasad Pokharel, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/936,215

(22) Filed: Mar. 26, 2018

(51) Int. Cl.
    *G11B 5/596* (2006.01)
    *G11B 20/12* (2006.01)

(52) U.S. Cl.
    CPC ...... *G11B 5/59688* (2013.01); *G11B 20/1258* (2013.01); *G11B 5/5965* (2013.01); *G11B 5/59638* (2013.01); *G11B 5/59661* (2013.01); *G11B 5/59666* (2013.01); *G11B 5/59672* (2013.01); *G11B 5/59677* (2013.01); *G11B 2020/1281* (2013.01)

(58) Field of Classification Search
None
See application file for complete search history.

(56) References Cited

U.S. PATENT DOCUMENTS

| | | | |
|---|---|---|---|
| 6,091,559 A | 7/2000 | Emo et al. | |
| 6,560,052 B2 | 5/2003 | Ng et al. | |
| 7,012,771 B1 | 3/2006 | Asgari et al. | |
| 9,070,411 B1* | 6/2015 | Ellis | G11B 5/59661 |
| 2007/0211368 A1* | 9/2007 | Shibano | G11B 5/59688 360/75 |
| 2008/0239557 A1* | 10/2008 | Gerasimov | G11B 5/59666 360/77.08 |
| 2008/0304172 A1* | 12/2008 | Bi | G11B 5/59655 360/48 |
| 2012/0162814 A1* | 6/2012 | Kimizuka | G11B 5/012 360/75 |
| 2013/0010382 A1* | 1/2013 | Nonaka | G11B 5/82 360/48 |
| 2013/0010383 A1* | 1/2013 | Nonaka | G11B 20/1258 360/51 |
| 2013/0010388 A1* | 1/2013 | Nonaka | G11B 5/59688 360/135 |
| 2013/0010389 A1* | 1/2013 | Nonaka | G11B 5/82 360/135 |

* cited by examiner

*Primary Examiner* — Tan X Dinh
(74) *Attorney, Agent, or Firm* — Holland & Hart LLP

(57) ABSTRACT

Systems and methods for servo zone transition optimization are described. In one embodiment, the storage system device includes a disk drive and a controller. In some embodiments, the controller may be configured to assess at least one operation of a read/write head of the disk drive; and format, based at least in part on the assessing of the read/write head, a disk surface of the disk drive with a first servo zone, a second servo zone, and an overlap region extending between a start point of the second servo zone and an end point of the first servo zone. In some cases, the overlap region starts towards a disk inner diameter (ID) and ends towards a disk outer diameter (OD).

19 Claims, 7 Drawing Sheets

SERVO ZONE TRANSITION OPTIMIZATION FOR MAGNETIC DISK RECORDING DEVICES

SUMMARY

The present disclosure is directed to methods and systems for servo zone transition optimization. Specifically, the present systems and methods are directed to optimizing the location of servo zone transitions in a storage drive based at least in part on servo pattern variable bit aspect ratio.

A storage system for servo zone transition optimization is described. In one embodiment, the storage system device may include a disk drive and a controller. In some embodiments, the controller may be configured to assess at least one operation of a read/write head of the disk drive; and format, based at least in part on the assessing of the read/write head, a disk surface of the disk drive with a first servo zone, a second servo zone, and an overlap region extending between a start point of the second servo zone and an end point of the first servo zone. In some cases, the overlap region may start towards a disk inner diameter (ID) and end towards a disk outer diameter (OD).

In some cases, a start point of the first servo zone may be towards the disk ID and the end point of the first servo zone is towards the disk OD, and wherein the start point of the second servo zone is towards the disk ID and an end point of the second servo zone is towards the disk OD.

In some cases, a highest recording density in the first servo zone may occur at the start point of the first servo zone and gradually decreases over the first servo zone to a lowest recording density at the end point of the first servo zone. In some cases, a highest recording density in the second servo zone may occur at the start point of the second servo zone and gradually decreases over the second servo zone to a lowest recording density at the end point of the second servo zone.

In some cases, the formatting of the disk surface may include selecting a recording density for at least one track within the first servo zone and selecting a recording density for at least one track within the second servo zone. In some cases, a recording density of the first servo zone at a point where the end point of the first servo zone overlaps the second servo zone in the overlap region may be a lower recording density than a recording density of the second servo zone at the point where the end point of the first servo zone overlaps the second servo zone.

In some cases, a width of the overlap region may be based at least in part on a servo sector error rate of the read/write head determined by the assessing of the read/write head. In some cases, a width of the overlap region may be centered on a radius of a zone switch between the first servo zone and the second servo zone. In some cases, the zone switch may include a concentric ring around the disk surface, the radius of the zone switch being a distance measured from the disk ID to the zone switch.

In some cases, a width of the overlap region may be based at least in part on a percentage of the radius of the zone switch. In some cases, an amount by which the overlap region extends towards the disk OD from the zone switch may be equal to X percent of the radius of the zone switch. In some cases, an amount by which the overlap region extends towards the disk ID from the zone switch may be equal to Y percent of the radius of the zone switch, X and Y being positive integers, Y being a same value as X or a different value than X.

In some embodiments, the hardware controller may be configured to reassess at least one operation of the read/write head of the disk drive after the formatting of the disk surface. In some embodiments, the hardware controller may be configured to operate the read/write head in the first zone using a first zone configuration. In some embodiments, the hardware controller may be configured to switch the read/write head to operate using a second zone configuration within the overlap region.

In some cases, the switching to the second zone configuration may occur at the start point of the second servo zone based at least in part on the assessing of the read/write head, the reassessing of the read/write head, or both the assessing and the reassessing. In some cases, the switching to the second zone configuration may occur at the end point of the first servo zone based at least in part on the assessing of the read/write head, the reassessing of the read/write head, or both the assessing and the reassessing. In some cases, the disk drive may perform internally the formatting of the disk surface or the assessing of the at least one operation of the read/write head of the disk drive, or both.

An apparatus for servo zone transition optimization is also described. In one embodiment, the apparatus may include a processor, memory in electronic communication with the processor, and instructions stored in the memory, the instructions being executable by the processor to perform the steps of assessing at least one operation of a read/write head of the disk drive; and formatting, based at least in part on the assessing of the read/write head, a disk surface of the disk drive with a first servo zone, a second servo zone, and an overlap region extending between a start point of the second servo zone and an end point of the first servo zone. In some cases, the overlap region may start towards a disk inner diameter (ID) and end towards a disk outer diameter (OD).

A method for servo zone transition optimization is also described. In one embodiment, the method may include assessing at least one operation of a read/write head of the disk drive; and formatting, based at least in part on the assessing of the read/write head, a disk surface of the disk drive with a first servo zone, a second servo zone, and an overlap region extending between a start point of the second servo zone and an end point of the first servo zone. In some cases, the overlap region may start towards a disk inner diameter (ID) and end towards a disk outer diameter (OD).

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
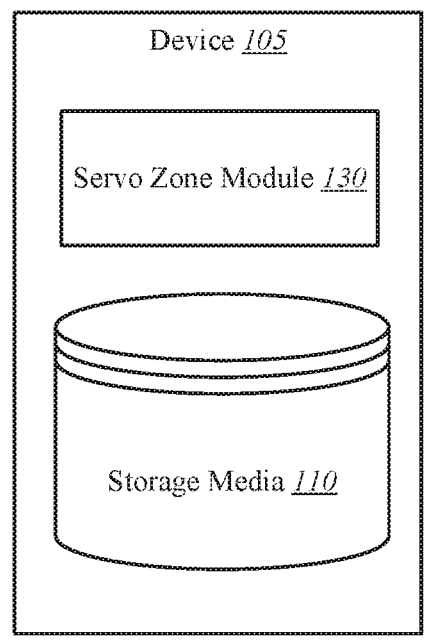
FIG. 1 is a block diagram of an example of a system in accordance with various embodiments.

The following relates generally to servo zone transition optimization. An embedded servo or wedge servo is a type of servo configuration used on hard disk drives. Embedded servo systems embed the feedback signals for read/write head positioners (e.g., a voice coil motor) inside gaps or wedges in the data tracks of the disk. In one embodiment, a servowriter or disk writer may be used in the manufacturing of a hard disk drive to format the surface of the disks in a hard drive (e.g., write servo tracks to the disk surface). A servowriter may be used to write servo tracks or a concentric string of sector marks on the disk platters to enable the servomechanism to position the actuator arm as the disk is spinning during a read/write operation. In some cases, the servowriter writes the tracks on the raw media in the factory before the media is assembled into the disk drive. In one embodiment, the concentric servo sectors may be written using a self-servo track writing (SSW) or concentric SSW process. SSW may include using the internal electronics of a disk drive to write the concentric servo sectors independent of an external servo writer.

The disks used in disk drives may include circular data tracks which extend circumferentially around the top/bottom surfaces of each disk. These data tracks may be defined by radially oriented servo patterns or servo tracks that contain servo information. The servo information may define the boundaries and centerlines of each of the data tracks. The servo data may be used to position the head over tracks of the disk, such as by seeking to a desired track or by following over the centerline of the desired track. The Servo patterns may be written to a disk after the disk has been installed into a drive, or prior to installation into a drive.

The servo patterns may be written to a surface of the disk in a plurality of radially extending servo sectors, as shown in the portion of a disk. Each of the servo sectors may contain servo information that is stored in various servo fields. The servo information identifies the location of "real" servo tracks by a track number or track ID. "Real" tracks may refer to the tracks defined by the servo information written to the disk. Tracks may be sequentially numbered in accordance with their radial position, for example where track zero may be located adjacent to an outer diameter (OD) of disk and a last track may be located adjacent to an inner diameter (ID) of disk. An example of a portion of a data track may include servo sectors interspersed between data areas, in which data such as user data may be stored. Servo sectors may provide coarse positioning information such as a track ID to locate a desired track, as well as fine positioning information to indicate a position of a head relative to a center line of a given data track. For example, burst patterns or null-type servo patterns may be used for coarse positioning.

The servo sectors may be written to the disk before or after the disk is installed into a drive. In the case of "post-written" disks, with servo data written after installation by the transducer head of a drive, uncontrolled factors such as bearing tolerances, spindle resonances, and the like, tend to introduce errors in the location of the servo information. Also, if the reference servo pattern used to write the final servo pattern was written externally then that may induce eccentricity. As a result, each track is typically not perfectly concentric with the axis of rotation of the disk, but rather exhibits certain random, repeatable variations which are sometimes referred to as repeatable runout (RRO).

A higher tracks-per-inch data density of a disk may be achieved by writing the servo sectors to the disks prior to their installation in a disk drive using highly precise servo writers. Although these "pre-written" tracks may result in an increase in the track per inch (TPI) of the disk, large RRO may result due to large eccentricity between the data tracks and the axis of rotation of the disk. This eccentricity may primarily stem from the re-mounting of the disk to the spindle motor of the disk drive. In addition, the RRO that affects disk drives using post-written disks may also be present when these pre-written disks are used. These differences between the written tracks and the axis of rotation of a disk may make it difficult for a transducer head to accurately and efficiently follow the written tracks as the disk spins.

Drives may be configured to address the eccentricity between the servo tracks and the axis of rotation of a disk by employing "virtual tracks," which may not perfectly coincide with the "real" tracks defined by the servo data. Virtual tracks may be referred to as virtual concentric aligned tracks (VCATs). Other systems and methods may also be used by drives which may result in a transducer head not perfectly following servo-defined tracks.

The present systems and methods improve servo performance through the use of variable servo density targets based on individual head and media capability. In addition to improved servo performance in the form of reduced sector error rates, an increase in head yield may also be seen. The present systems and methods may use servo "zoning" or characterization of servo equalization parameters with respect to radius. Once the parametric values for optimal servo pattern recovery are determined, these values may be stored in servo non-volatile memory. These values may be subsequently programmed into the channel as the head crosses into a new servo zone. The present systems and methods include an actual physical demarcation between zones by changing the servo density to reduce the format overhead as the radius increases.

'Once physical zones are denoted by discontinuous changes in servo density at the zone boundaries, the present systems and methods may improve performance, head yield, and the total cost of ownership of associated devices. By formatting the disk surface with an overlap region that is large enough to allow a density change in the adjacent servo zones that is sufficient to allow relatively poorer heads to operate with acceptable sector error rate, the poorer heads may be salvaged and their respective operating lifespan increased.

The standard measure of pulse width in magnetic recording is the half width, called PW50. A head with a poor sector error rate due to larger PW50, larger passive fly height, lower intrinsic signal to noise ratio (SNR), or any combination of these, may be improved by limiting a maximum density with which the questionable head must function. This may be done by moving the actual zone switch point out towards the OD of the disk. Thus, a conventional large overlap region may then be overwritten either completely or to some lesser extent to meet other system requirements.

In one embodiment, self-servo-writing (SSW) may be done by the storage drive. With SSW, the kilo flux changes per inch (KFCI) capability assessment is more accurate and may be integrated efficiently into the SSW and/or capability test process. For example, the SSW process may start with servo pattern writing from the OD of a first zone (e.g., zone 0), and writing towards ID with up to X % higher KFCI than a conventional system, as the controller checks to see up to what density the servo sector error rate (SSER) remains satisfactory. In some cases, this process may be used as a guide to predict the maximum KFCI to target in a subsequent servo zone to improve pattern writing times and avoid large servo zone overlaps. In some cases, the controller may regularly audit SSER at one or more predetermined and/or randomly selected locations, and decide on zone transition SSER targets while avoiding relatively large overlap regions where the servo zone transitions occur.

In one embodiment, the capability test process may determine the full capabilities of the read/write head. In one embodiment, the controller may limit servo sector error rate testing and select the switch point that meets the error rate specification. In some cases, the controller may use other metrics like Viterbi detector margin metrics to determine the average amount of margin in the detection system. The maximum linear density may then be adjusted to maintain a specific amount of margin at each servo zone boundary.

In one embodiment, the controller may overwrite the unused servo format to any degree acceptable to recover the disk area and return it to the data format for use in storage of user data. Some metrics that may determine how much the system can trim from the servo format may include expected disk slip, eccentricity, rework criteria, etc. Integrating the present systems and methods into the SSW process may enable the system to avoid relatively large overlap regions as well as avoid having to use a trimming step.

In one embodiment, each servo zone may be configured with a default servo pattern frequency. For example, a first servo zone may be configured with a first default servo pattern frequency, a second servo zone may be configured with a second default servo pattern frequency, and so forth. In some embodiments, one or more aspects of a default servo pattern frequency may be adjusted based at least in part on a result of assessing a read/write head of a disk drive. Additionally or alternatively, one or more aspects of a default servo pattern frequency may be adjusted based at least in part on an assessment of a disk surface of the disk drive. In one example, one or more aspects of a default servo pattern frequency may be adjusted based at least in part on a measured signal-to-noise ratio for a given read/write head operating on a given storage medium. Examples of adjusting a default servo pattern may include at least one of increasing or decreasing an initial frequency of a default servo pattern frequency, increasing or decreasing an intermediary frequency of a default servo pattern frequency, increasing or decreasing an end frequency of a default servo pattern frequency, or any combination thereof.

In some cases, each servo zone may be configured with a default start location and/or default end location. For example, a first servo zone may be configured with a default first zone start location at a predetermined distance from ID or OD, and/or may be configured with a default first zone end location at a predetermined distance from ID or OD. Similarly, a second servo may be configured with a default second zone start location at a predetermined distance from ID or OD and/or or default second zone end location at a predetermined distance from ID or OD, and so on. In some embodiments, one or more aspects of a default start location may be adjusted based at least in part on a result of assessing a read/write head of a disk drive. Examples of adjusting the default start location may include increasing the default start location towards ID, increasing the default start location towards OD, decreasing the default start location away from ID, or decreasing the default start location away from OD. Additionally or alternatively, one or more aspects of a default end location may be adjusted based at least in part on a result of assessing a read/write head of a disk drive. Examples of adjusting the default end location may include increasing the default end location towards ID, increasing the default end location towards OD, decreasing the default end location away from ID, or decreasing the default end location away from OD.

FIG. 1 is a block diagram illustrating one embodiment of an environment 100 in which the present systems and methods may be implemented. The environment may include device 105 and storage media 110. The storage media 110 may include any combination of hard disk drives, solid state drives, and hybrid drives that include both hard disk and solid state drives. In some embodiment, the storage media 110 may include shingled magnetic recording (SMR) storage drives. In some embodiments, the systems and methods described herein may be performed on a single device such as device 105. In some cases, the methods described herein may be performed on multiple storage devices or a network of storage devices such a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include servo zone module 130. In one example, the device 105 may be coupled to storage media 110. In some embodiments, device 105 and storage media 110 may be components of flash memory or a solid state drive and/or another type of storage drive. Alternatively, device 105 may be a component of a host of the storage media 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, device 105 may include a wired and/or a wireless connection to an external database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage media 110 may be internal to device 105. As one example, device 105 may include a storage controller that interfaces with storage media of storage media 110. Servo zone module 130 may optimize servo zone transitions in a hard disk drive. In some cases, servo zone module 130 may be configured to optimize the location of one or more servo zone transitions in a storage drive based at least in part on a servo pattern variable bit aspect ratio.

Figure 2:
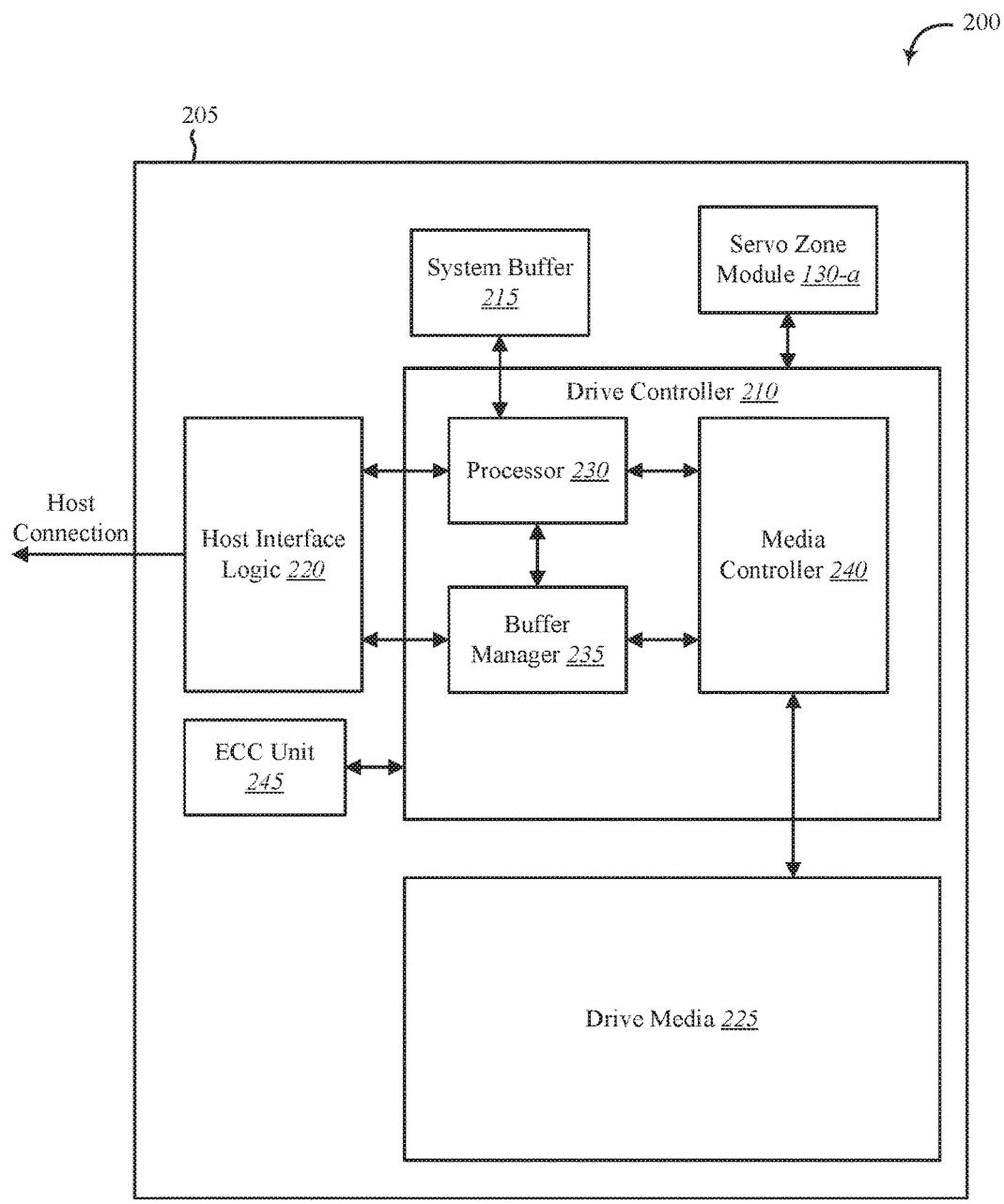
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and servo zone module 130-*a*. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The drive controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, ECC unit 245 may perform error correction on data stored in drive media 225.

In some embodiments, servo zone module 130-*a* may include at least one of one or more processors, one or more memory devices, one or more storage devices, instructions executable by one or more processors stored in one or more memory devices and/or storage devices, or any combination thereof. Although depicted outside of drive controller 210, in some embodiments, servo zone module 130-*a* may include software, firmware, and/or hardware located within drive controller 210 and/or operated in conjunction with drive controller 210. For example, servo zone module 130-*a* may include at least a portion of processor 230, buffer manager 235, and/or media controller 240. In one example, servo zone module 130-*a* may include one or more instructions executed by processor 230, buffer manager 235, and/or media controller 240.

Figure 3:
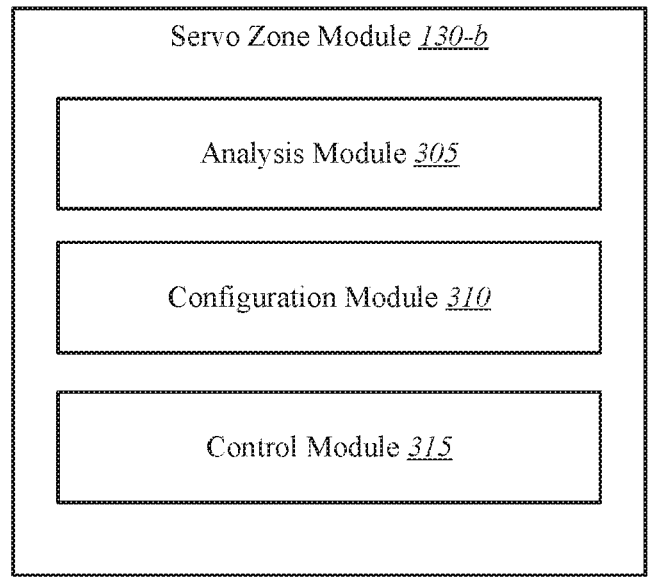
FIG. 3 shows a block diagram of one or more modules in accordance with various aspects of this disclosure.

FIG. 3 shows a block diagram of servo zone module 130-*b*. The servo zone module 130-*b* may include one or more processors, memory, and/or one or more storage devices. The servo zone module 130-*b* may include analysis module 305, configuration module 310, and control module 315. The servo zone module 130-*b* may be one example of servo zone module 130 of FIGS. 1 and/or 2. Each of these components may be in communication with each other.

In one embodiment, servo zone module 130-*b*, analysis module 305, configuration module 310, and/or analysis module 305 may perform at least one of the operations described herein in conjunction with one or more controllers and/or one or more processors within the disk drive, the operations being performed independent of any device external to the disk drive.

In one embodiment, analysis module 305 may be configured to assess at least one operation of a read/write head of the disk drive. In one embodiment, analysis module 305 may measure a kilo flux changes per inch (KFCI) measurement of the read/write head. In some cases, the assessment may determine a maximum KFCI of the read/write head.

In one embodiment, configuration module 310 may be configured to format a disk surface of the disk drive. In some cases, configuration module 310 may format the disk surface with at least one of a first servo zone, a second servo zone, or an overlap region extending between a start point of the second servo zone and an end point of the first servo zone, or any combination thereof. In some cases, configuration module 310 may format the disk surface based at least in part on one or more results of the assessing of the read/write head. In some embodiments, the overlap region may start towards a disk inner diameter (ID) and may end towards a disk outer diameter (OD).

In some embodiments, one or more results of the read/write head capability assessment may be used by configuration module 310 as a guide in formatting the disk surface.

For example, configuration module 310 may use one or more results of the assessment to predict a maximum KFCI to target in a subsequent servo zone to improve pattern writing times and avoid large servo zone overlaps. In some cases, analysis module 305 may regularly audit SSER at one or more predetermined and/or randomly selected locations, and select zone transition SSER targets while avoiding relatively large overlap regions where the servo zone transitions occur.

In one embodiment, the read/write head capability assessment may determine the full capabilities of the read/write head. In one embodiment, analysis module 305 may limit servo sector error rate testing. Based on the testing, configuration module 310 may select the switch point that meets the error rate specification. In some cases, analysis module 305 may use other metrics like Viterbi detector margin metrics to determine the average amount of margin in the detection system. The maximum linear density may then be adjusted by configuration module 310 to maintain a specific amount of margin at each servo zone boundary.

In some embodiments, a start point of the first servo zone may be towards the disk ID and the end point of the first servo zone is towards the disk OD. In some cases, the start point of the second servo zone may be towards the disk ID and an end point of the second servo zone is towards the disk OD.

In some cases, a highest recording density in the first servo zone may occur at the start point of the first servo zone and gradually decrease over the first servo zone to a lowest recording density at the end point of the first servo zone. In some cases, a highest recording density in the second servo zone may occur at the start point of the second servo zone and gradually decrease over the second servo zone to a lowest recording density at the end point of the second servo zone.

In some embodiments, the formatting of the disk surface may include selecting a recording density for at least one track within the first servo zone and selecting a recording density for at least one track within the second servo zone.

In some cases, a recording density of the first servo zone at a point where the end point of the first servo zone overlaps the second servo zone in the overlap region may be a lower recording density than a recording density of the second servo zone at the point where the end point of the first servo zone overlaps the second servo zone.

In some embodiments, a width of the overlap region may be based at least in part on a servo sector error rate of the read/write head determined by the assessing of the read/write head by analysis module 305. In some embodiments, a width of the overlap region may envelop a radius of a zone switch between the first servo zone and the second servo zone.

In some cases, the overlap region may be centered on the radius of the zone switch. In some embodiments, the zone switch may include a concentric ring around the disk surface. In some cases, the radius of the zone switch may be a distance measured from the disk ID to the zone switch.

In some embodiments, a width of the overlap region may be based at least in part on a percentage of the radius of the zone switch. In some cases, an amount by which the overlap region extends towards the disk OD from the zone switch may be equal to X percent of the radius of the zone switch.

In some embodiments, an amount by which the overlap region extends towards the disk ID from the zone switch may be equal to Y percent of the radius of the zone switch, X and Y being positive integers, Y being a same value as X or a different value than X.

In some embodiment, analysis module 305 may reassess at least one operation of the read/write head of the disk drive after configuration module 310 formats the disk surface. In some embodiments, control module 315 may be configured to operate the read/write head in the first zone using a first zone configuration. In some embodiments, control module 315 may be configured to switch the read/write head to operate using a second zone configuration within the overlap region.

In some embodiments, the switching to the second zone configuration may occur at the start point of the second servo zone based at least in part on the assessing of the read/write head, the reassessing of the read/write head, or both the assessing and the reassessing. In some cases, the switching to the second zone configuration may occur at the end point of the first servo zone based at least in part on the assessing of the read/write head, the reassessing of the read/write head, or both the assessing and the reassessing.

Figure 4:
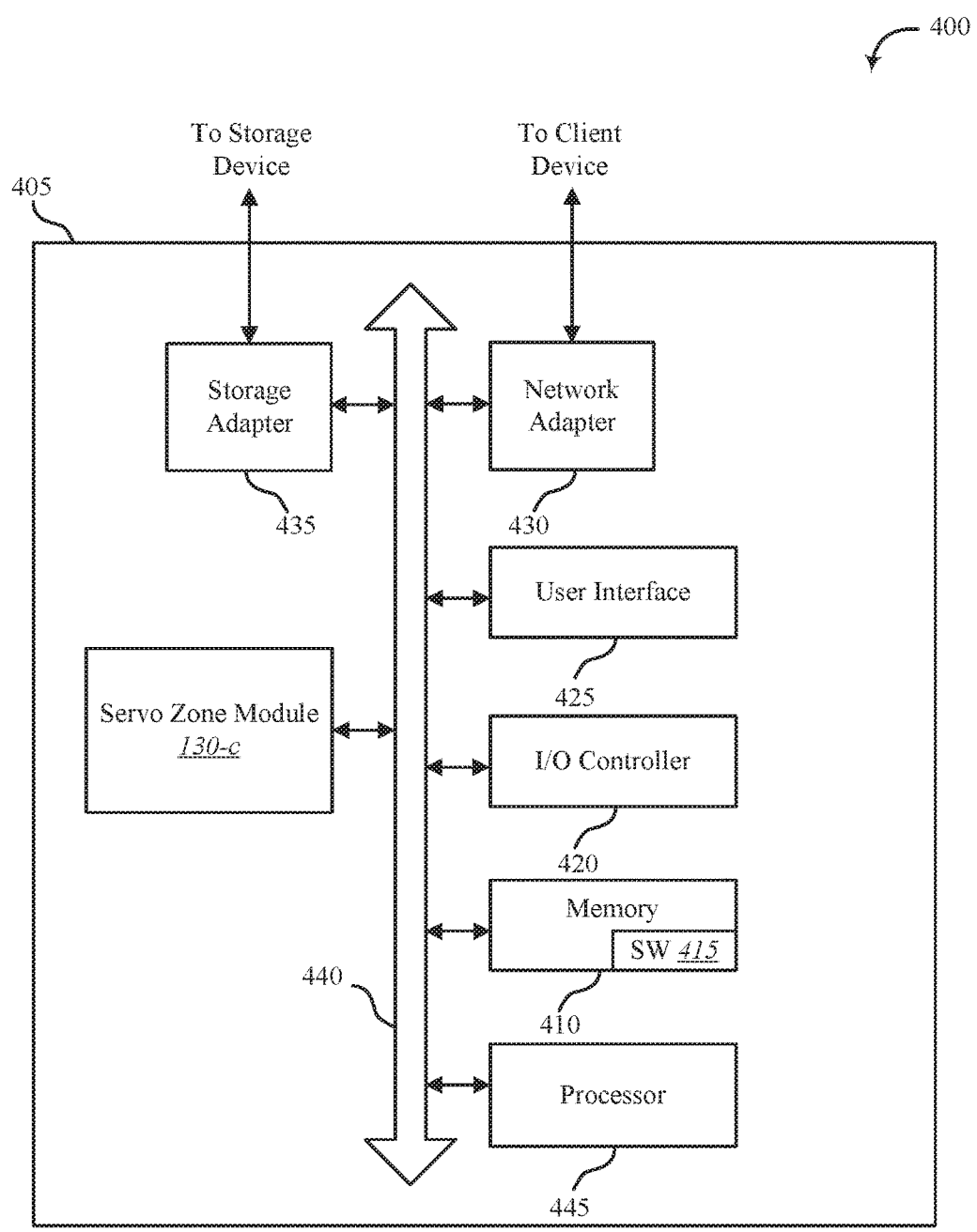
FIG. 4 shows a diagram of a system in accordance with various aspects of this disclosure.

FIG. 4 shows a system 400 for servo zone transition optimization, in accordance with various examples. System 400 may include an apparatus 405, which may be an example of any one of device 105 of FIG. 1 and/or apparatus 205 of FIG. 2.

Apparatus 405 may include components for bi-directional voice and data communications including components for transmitting communications and components for receiving communications. For example, apparatus 405 may communicate bi-directionally with one or more storage devices and/or client systems. This bi-directional communication may be direct (apparatus 405 communicating directly with a storage system, for example) and/or indirect (apparatus 405 communicating indirectly with a client device through a server, for example).

Apparatus 405 may also include a processor module 445, and memory 410 (including software/firmware code (SW) 415), an input/output controller module 420, a user interface module 425, a network adapter 430, and a storage adapter 435. The software/firmware code 415 may be one example of a software application executing on apparatus 405. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 405 may provide a connection using wireless techniques, including digital cellular telephone connection, Cellular Digital Packet Data (CDPD) connection, digital satellite data connection, and/or another connection. The apparatus 405 may include servo zone module 130-c, which may perform the functions described above for the servo zone module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 405 such as processor module 445, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 445 to perform various functions described in this disclosure. Alternatively, the software/firmware code 415 may not be directly executable by the processor module 445 but may cause a computer (when compiled and executed, for example) to perform functions described herein. Alternatively, the computer-readable, computer-executable software/firmware code 415 may not be directly executable by the processor module 445, but may be configured to cause a computer, when compiled and executed, to perform functions described herein. The processor module 445 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the servo zone module 130-*c* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 405 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 405 to access one or more data storage devices such as storage media 110. The one or more data storage devices may include two or more data tiers each. The storage adapter 435 may include one or more of an Ethernet adapter, a Fibre Channel adapter, Fibre Channel Protocol (FCP) adapter, a SCSI adapter, and iSCSI protocol adapter.

Figure 5:
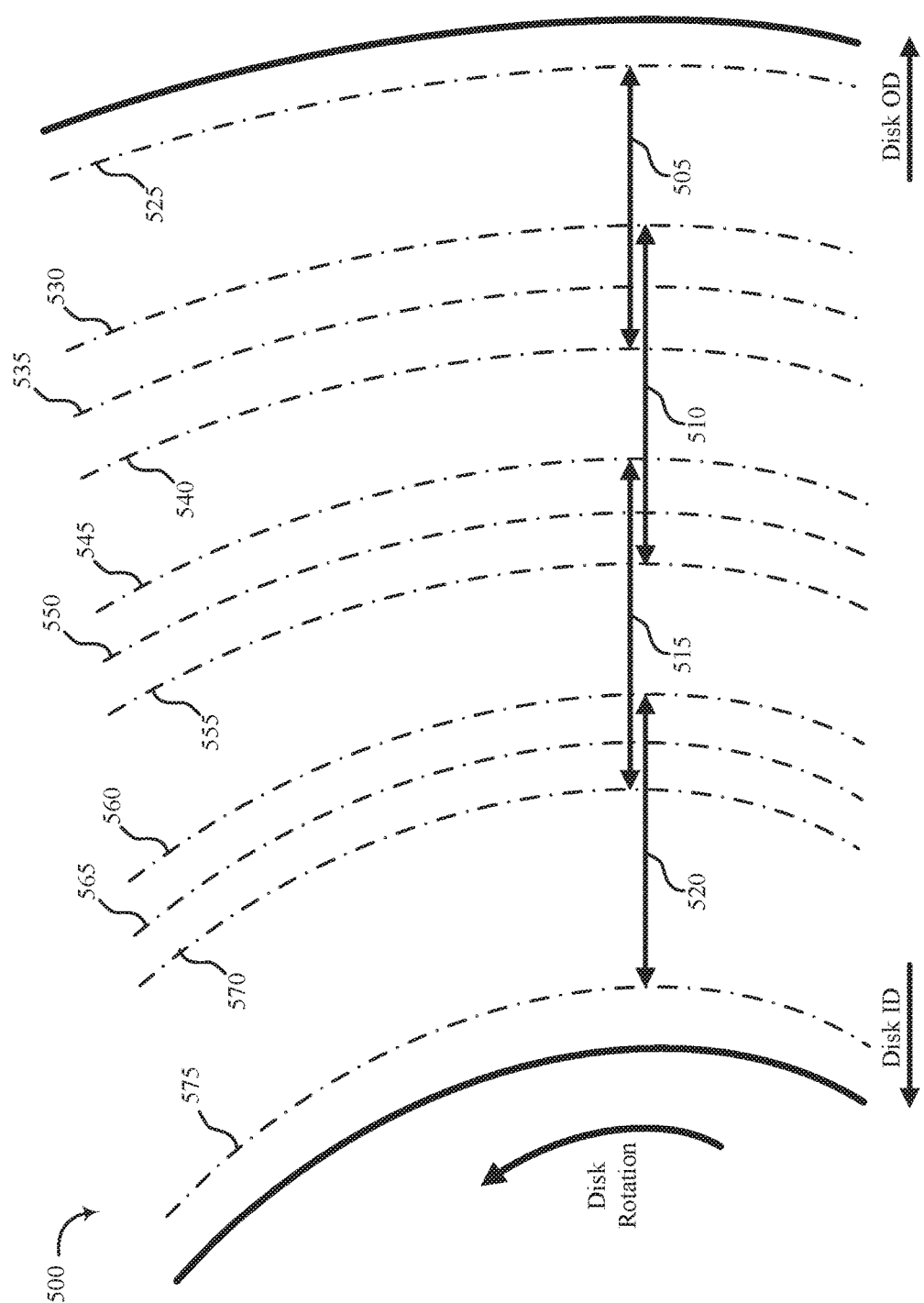
FIG. 5 shows one embodiment of an environment in accordance with various aspects of this disclosure.

FIG. 5 shows an environment 500 for servo zone transition optimization, in accordance with various examples. At least one aspect of environment 500 may be implemented in conjunction with device 105 of FIG. 1, apparatus 205 of FIG. 2, and/or servo zone module 130 depicted in FIGS. 1, 2, 3, and/or 4.

From the given perspective shown in FIG. 5, the disk rotation is counter-clockwise, the disk inner diameter (ID) is to the left, and the disk outer diameter (OD) is to the right. In one embodiment, environment 500 may include a surface of a disk from a hard disk drive.

In some embodiments, environment 500 may include first servo zone 505, second servo zone 510, third servo zone 515, and fourth servo zone 520. In some embodiments, environment 500 may include OD radius 525 adjacent to the OD side of the disk and ID radius 575 adjacent to the ID side of the disk.

As shown, environment 500 may include Z21 radius 535, Z32 radius 550, and Z43 radius 565. In one embodiment, Z21 radius 535 represents a nominal radius between second servo zone 510 and first servo zone 505; Z32 radius 550 represents a nominal radius between third servo zone 515 and second servo zone 510; and Z43 radius 565 represents a nominal radius between fourth servo zone 520 and third servo zone 515.

As illustrated, adjacent to either side of Z21 radius 535 may be Z21+X radius 530 and Z21−X radius 540. In one embodiment, Z21+X radius 530 is a radius located X units from Z21 radius 535 in the OD direction, and Z21−X radius 540 is a radius located X units from Z21 radius 535 in the ID direction, where "units" refers to a given unit of measure such as inches, millimeters, etc. (e.g., X=10 millimeters). Alternatively, "units" may refer to a percentage value such as 5%, 10%, etc.

As illustrated, adjacent to either side of Z32 radius 550 may be Z32+Y radius 545 and Z32−Y radius 555. In one embodiment, Z32+Y radius 545 is a radius located Y units from Z32 radius 550 in the OD direction, and Z32−Y radius 555 is a radius located Y units from Z32 radius 550 in the ID direction.

As illustrated, adjacent to either side of Z43 radius 565 may be Z43+Z radius 560 and Z43−Z radius 570. In one embodiment, Z43+Z radius 560 is a radius located Z units from Z43 radius 565 in the OD direction, and Z43−Z radius 570 is a radius located Z units from Z43 radius 565 in the ID direction.

As shown, first servo zone 505 may extend from OD radius 525 to Z21−X radius 540; second servo zone 510 may extend from Z21+X radius 530 to Z32−Y radius 555; third servo zone 515 may extend from Z32+Y radius 545 to Z43−Z radius 570; and fourth servo zone 520 may extend from Z43+Z radius 560 to ID radius 575.

As illustrated, first servo zone 505 may overlap second servo zone 510 from Z21+X radius 530 to Z21−X radius 540; second servo zone 510 may overlap third servo zone 515 from Z32+Y radius 545 to Z32−Y radius 555; and third servo zone 515 may overlap fourth servo zone 520 from Z43+Z radius 560 to Z43−Z radius 570.

In one embodiment, values X, Y, and Z may represent a percentage. In some cases, the value X may be different than the values of Y and Z, and value Y may be different than Z. For example, the value of X may be 5%, the value of Y may be 4%, and the value of Z may be 6%. In some cases, X may equal Y and/or Z; Y may equal X and/or Z; Z may equal X and/or Y. As one example, X=Y=Z=10%.

In some embodiments, Z21+X radius 530 and Z21−X radius 540 may be situated asynchronously around Z21 radius 535. For instance, Z21+X radius 535 may be located a different amount or percentage from Z21 radius 535 than Z21−X radius 540 is located from Z21 radius 535. As one example, Z21+X radius 530 may be located 5 units from Z21 radius 535, while Z21−X radius 540 may be located 7 units from Z21 radius 535. Additionally or alternatively, Z32+Y radius 545 and Z32−Y radius 555 may be situated asynchronously around Z32 radius 550, where Z32+Y radius 545 may be located a different amount or percentage from Z32 radius 550 than Z32−Y radius 555 is located from Z32 radius 550. Additionally or alternatively, Z43+Z radius 560 and Z43−Z radius 570 may be situated asynchronously around Z43 radius 565, where Z43+Z radius 560 may be located a different amount or percentage from Z43 radius 565 than Z43−Z radius 570 is located from Z43 radius 565.

In one embodiment, environment 500 may depict a single servo gate region across a surface of a disk. The servo gate region may include the alternating servo zones first servo zone 505, second servo zone 510, third servo zone 515, and fourth servo zone 520. In one embodiment, each servo zone may be configured with different servo densities. In one embodiment, the density in each servo zone may decrease with increasing radius in the direction from disk ID to disk OD. In some cases, the servo density of each servo zone may vary across span of each servo zone. For example, the servo density of fourth servo zone 520 may vary from the start of fourth servo zone 520 at ID radius 575 to the end of fourth servo zone 520 at Z43+Z radius 560.

In some embodiments, servo density may decrease across a servo zone. For example, the servo density of first servo zone 505 may decrease from the start of first servo zone 505 at Z21−X radius 540 to the end of first servo zone 505 at OD radius 525. In some embodiments, the servo density of a first given servo zone may vary from the servo density of a second given servo zone over the same area of an overlap region between the first and second servo zones. For example, as shown the servo density of first servo zone 505 may overlap the second servo zone 510 from Z21−X radius 540 to Z21+X radius 530. Over this overlap region, the servo density of first servo zone 505 may vary from 96 kilo flux changes per inch (KFCI) at Z21−X radius 540 to 84 KFCI at Z21+X radius 530, while the servo density of second servo zone 510 may vary from 77 KFCI at Z21−X radius 540 to 70 KFCI at Z21+X radius 530.

In one embodiment, at least a portion of the servo zones may be prewritten with prewritten servo information. For example, the overlap regions between first servo zone 505 and second servo zone 510, between second servo zone 510 and third servo zone 515, and/or between third servo zone 515 and fourth servo zone 520 may be prewritten with servo information. The servo information may include a servo density to implement and/or servo pattern that indicates a pattern for a read/write head to follow concentrically around the disk surface. In some cases, the servo information in the overlap regions may include servo information for at least two servo zones. For example, the overlap region between first servo zone 505 and second servo zone 510 from Z21−X radius 540 to Z21+X radius 530 may be prewritten with a first set of servo information for first servo zone 505 and prewritten with a second set of servo information for second servo zone 510. Accordingly, in one embodiment a servo controller may be configured to select which servo pattern to use when operating in the overlap region. The servo controller may select which servo pattern to use for position feedback.

In one embodiment, fourth servo zone 520 begins with its highest servo density at ID radius 575 and continuously decreases in density to its minimum servo density at Z43+Z radius 560. Similarly, third servo zone 515 begins with its highest servo density at Z43−Z radius 570 and continuously decreases in density to its minimum servo density at Z32+Y radius 545, and so on.

In one embodiment, each successive servo zone begins at a higher servo density than the servo density of the preceding servo zone at the same point. In one embodiment, the fourth servo zone 520 precedes the third servo zone 515; the third servo zone 515 precedes the second servo zone 510; and the second servo zone 510 precedes the first servo zone 505. Similarly, in one embodiment the second servo zone 510 succeeds the third servo zone 515; the third servo zone 515 succeeds the fourth servo zone 520; and the first servo zone 505 succeeds the second servo zone 510. In one embodiment, third servo zone 515 is a next servo zone after fourth servo zone 520; second servo zone 510 is a next servo zone after third servo zone 515; and first servo zone 505 is a next servo zone after the second servo zone 510. Thus, in one embodiment fourth servo zone 520 enters the overlap region between Z43−Z radius 570 and Z43+Z radius 560 at a lower servo density than the initial servo density of the third servo zone 515 at the same point. Similarly, in one embodiment third servo zone 515 enters the overlap region between Z32−Y radius 555 and Z32+Y radius 545 at a lower servo density than the initial servo density of the second servo zone 510 at the same point, and so on.

In some embodiments, the servo density seen by the read/write head may vary by up to a factor of two over an overlap region. For example, a servo density of second servo zone 510 may be 50 KFCI at the beginning of the overlap region at Z21−X radius 540, while the servo density of first servo zone 505 may be 100 KFCI at the end of the overlap region at Z21+X radius 530.

In some cases, a controller of the storage drive may determine a maximum servo density a read/write head is capable of handling. In some embodiments, a controller may test a variable bit aspect ratio (VBAR) capability of a read/write head. In one embodiment, the VBAR test may measure the length and/or width of bits the read/write head is capable of reading, and/or the length and/or width of bits the read/write head is capable of writing.

In one example, when a controller determines that a read/write head is capable of handling relatively higher servo densities, then the controller may switch to the next servo zone earlier into the overlap region (i.e., towards the ID side of the overlap region) or right at the beginning of the overlap region. For example, a read/write head may be currently configured to operate in the second servo zone 510. When the controller determines that the read/write head is capable of handling the higher servo densities of first servo zone 505 at the beginning edge of an overlap region at Z21−X radius 540, then the controller may switch the read/write head to operate in the first servo zone 505 from the beginning of the overlap region at Z21−X radius 540 or closer to the beginning of this overlap region, configuring the read/write head to use the higher servo densities of first servo zone 505 across this overlap region.

In some embodiments, when the read/write head is not capable of using a higher density, then the controller may delay the zone change to a location closer to the OD of the overlap region. In one embodiment, when a controller determines that a read/write head is not capable of handling higher servo densities at the beginning of an overlap region, then the controller may wait to switch to the next servo zone further into the overlap region or at the end of the servo region. For example, a read/write head may be currently configured to operate in the third servo zone 515. When the controller determines that the read/write head is not capable of handling the higher servo densities of second servo zone 510 at the beginning edge of the overlap region at Z32−Y radius 555, then the controller may wait to switch the read/write head to operate in the second servo zone 510 towards the end or at the end of the overlap region at Z32+Y radius 545, having the read/write head continue to use the lower servo densities of third servo zone 515 across this overlap region.

In one example, values X, Y, and Z may represent a percentage where X=Y=Z=5%, providing a total of 10% density variation across an overlap region. In this example, ID radius 575 may be located at 0.5 inch (0.5") from disk ID; Z43 radius 565 may be located at 0.7" from disk ID; Z32 radius 550 may be located at 0.9" from disk ID; Z21 radius 535 may be located at 1.1" from disk ID; and OD radius 525 may be located at 1.3". With Z=5%, Z43−Z radius 570 may extend 5% towards ID from Z43 radius 565, and Z43+Z radius 560 may extend 5% towards OD from Z43 radius 565. Thus, 5% of the 0.7" value of Z43 radius 565 being 0.035", Z43−Z radius 570 may be located at 0.665" from disk ID and Z43+Z radius 560 may be located at 0.735" from disk ID. Similarly, 5% of the 0.9" value of Z32 radius 550 being 0.045", Z32−Y radius 555 may be located at 0.855" from disk ID and Z32+Y radius 545 may be located at 0.945" from disk ID. Similarly, 5% of the 1.1" value of Z21 radius 535 being 0.055", Z21−X radius 540 may be located at 1.045" from disk ID and Z21+X radius 530 may be located at 1.155" from disk ID.

Figure 6:
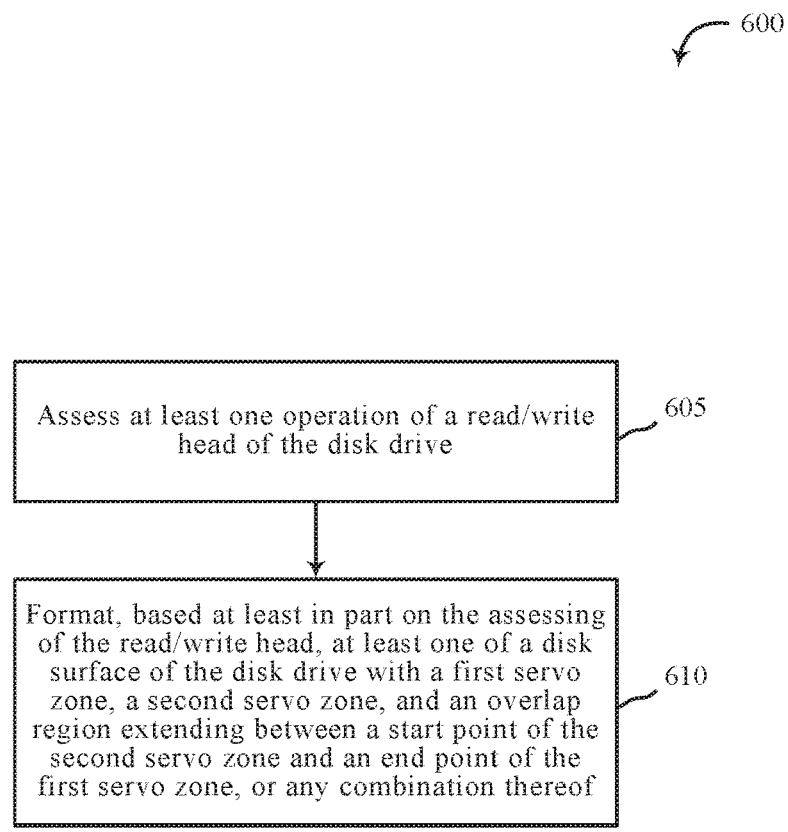
FIG. 6 is a flow chart illustrating an example of a method in accordance with various aspects of this disclosure.

FIG. 6 is a flow chart illustrating an example of a method 600 for servo zone transition optimization, in accordance with various aspects of the present disclosure. One or more aspects of the method 600 may be implemented in conjunction with device 105 of FIG. 1, apparatus 205 of FIG. 2, and/or servo zone module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, method 600 may include assessing at least one operation of a read/write head of the disk drive. At block 610, method 600 may include formatting at least one of a disk surface of the disk drive with a first servo zone, a second servo zone, and an overlap region extending between a start point of the second servo zone and an end point of the first servo zone, or any combination thereof. In some cases, the formatting may be based at least in part on the assessing of the read/write head. In some cases, the overlap region may start towards a disk inner diameter (ID) and end towards a disk outer diameter (OD).

The operation(s) at block 605-610 may be performed using the servo zone module 130 described with reference to FIGS. 1-4 and/or another module. Thus, the method 600 may provide for servo zone transition optimization. It should be noted that the method 600 is just one implementation and that the operations of the method 600 may be rearranged, omitted, and/or otherwise modified such that other implementations are possible and contemplated.

Figure 7:
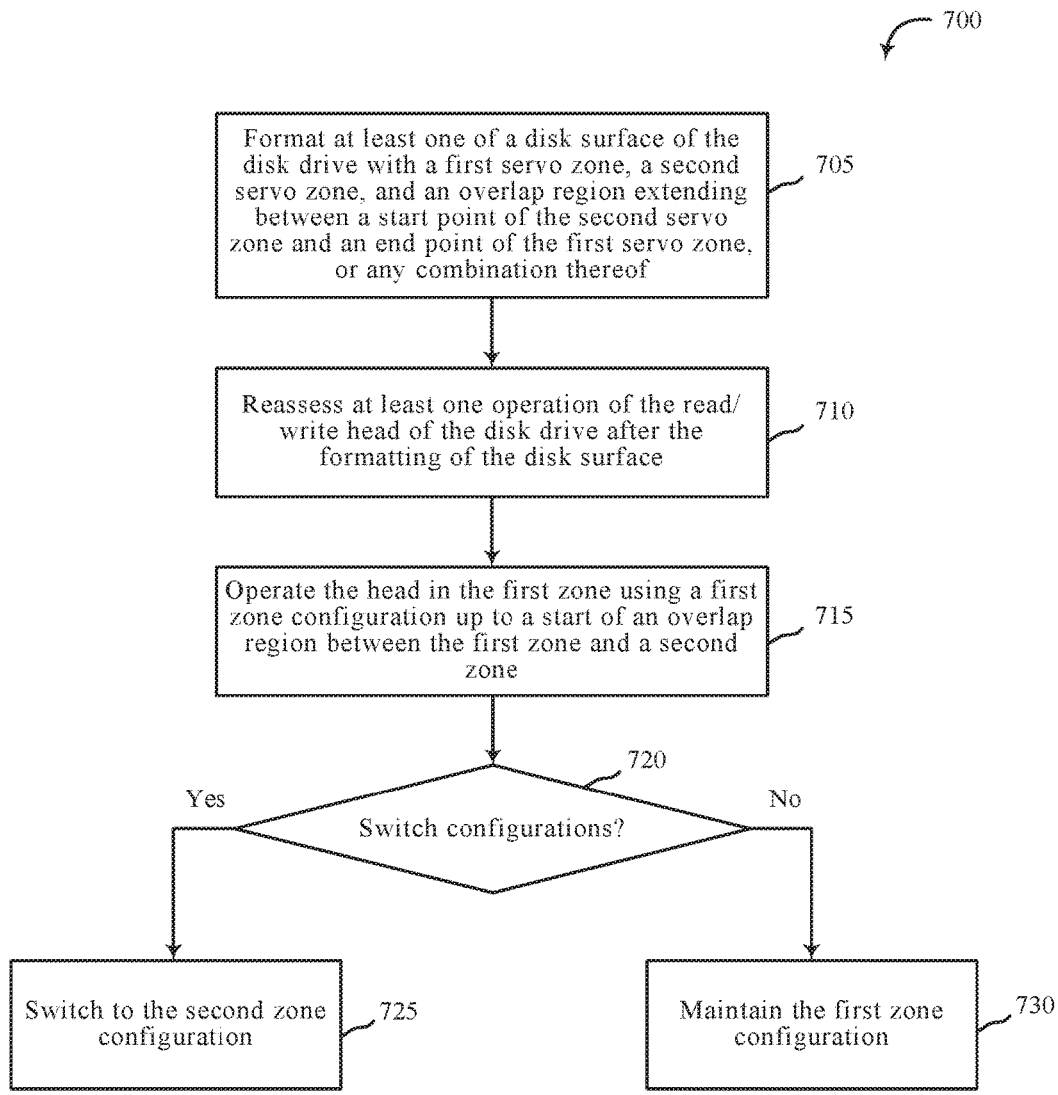
FIG. 7 is a flow chart illustrating an example of a method in accordance with various aspects of this disclosure.

FIG. 7 is a flow chart illustrating an example of a method 700 for servo zone transition optimization, in accordance with various aspects of the present disclosure. One or more aspects of the method 700 may be implemented in conjunction with device 105 of FIG. 1, apparatus 205 of FIG. 2, and/or servo zone module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, method 700 may include formatting, based at least in part on an assessing of the read/write head, at least one of a disk surface of the disk drive with a first servo zone, a second servo zone, and an overlap region extending between a start point of the second servo zone and an end point of the first servo zone, or any combination thereof.

At block 710, method 700 may include reassessing at least one operation of the read/write head of the disk drive after the formatting of the disk surface. At block 715, method 700 may include operating the head in the first zone using a first zone configuration.

At block 720, method 700 may include determining whether to switch to a second zone configuration upon entering the overlap area, or to maintain the first zone configuration. At block 725, upon determining to switch to the second zone configuration, method 700 may configure the read/write head to operate using the second zone configuration.

At block 730, upon determining to maintain the first zone configuration, method 700 may include maintaining the first zone configuration at least at the start of the overlap region. In some cases, the method 700 may switch configurations at the start of the overlap region, switch configurations anywhere within the overlap region, or switch configurations at the end of the overlap region.

The operations at blocks 705-730 may be performed using the servo zone module 130 described with reference to FIGS. 1-4 and/or another module. Thus, the method 700 may provide for servo zone transition optimization. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
 a disk drive; and
 a hardware controller configured to assess at least one operation of a read/write head of the disk drive; and format, based at least in part on the assessing of the read/write head, a disk surface of the disk drive with a first servo zone, a second servo zone, and an overlap region extending between a start point of the second servo zone and an end point of the first servo zone, the overlap region starting towards a disk inner diameter (ID) and ending towards a disk outer diameter (OD), a width of the overlap region being based at least in part on a servo sector error rate of the read/write head determined by the assessing of the read/write head.

2. The storage system of claim 1, wherein a start point of the first servo zone is towards the disk ID and the end point of the first servo zone is towards a disk OD, and wherein the start point of the second servo zone is towards the disk ID and an end point of the second servo zone is towards the disk OD.

3. The storage system of claim 2, wherein a highest recording density in the first servo zone occurs at the start point of the first servo zone and gradually decreases over the first servo zone to a lowest recording density at the end point of the first servo zone; and wherein a highest recording density in the second servo zone occurs at the start point of the second servo zone and gradually decreases over the second servo zone to a lowest recording density at the end point of the second servo zone.

4. The storage system of claim 1, wherein the formatting of the disk surface includes selecting a recording density for at least one track within the first servo zone and selecting a recording density for at least one track within the second servo zone.

5. The storage system of claim 1, wherein a recording density of the first servo zone at a point where the end point of the first servo zone overlaps the second servo zone in the overlap region is a lower recording density than a recording density of the second servo zone at the point where the end point of the first servo zone overlaps the second servo zone.

6. The storage system of claim 1, wherein:
 the width of the overlap region is centered on a radius of a zone switch between the first servo zone and the second servo zone; and
 the zone switch includes a concentric ring around the disk surface, the radius of the zone switch being a distance measured from the disk ID to the zone switch.

7. The storage system of claim 6, wherein the width of the overlap region is based at least in part on a percentage of the radius of the zone switch.

8. The storage system of claim 6, wherein an amount by which the overlap region extends towards the disk OD from the zone switch is equal to X percent of the radius of the zone switch.

9. The storage system of claim 8, wherein an amount by which the overlap region extends towards the disk ID from the zone switch is equal to Y percent of the radius of the zone switch, X and Y being positive integers, Y being a same value as X or a different value than X.

10. The storage system of claim 1, wherein the hardware controller is further configured to:
 reassess the at least one operation of the read/write head of the disk drive after the formatting of the disk surface.

11. The storage system of claim 10, wherein the hardware controller is further configured to:
 operate the read/write head in the first servo zone using a first zone configuration; and
 switch the read/write head to operate using a second zone configuration within the overlap region.

12. The storage system of claim 11, wherein the switching to the second zone configuration occurs at the start point of the second servo zone based at least in part on the assessing of the read/write head, the reassessing of the read/write head, or both the assessing and the reassessing.

13. The storage system of claim 11, wherein the switching to the second zone configuration occurs at the end point of the first servo zone based at least in part on the assessing of the read/write head, the reassessing of the read/write head, or both the assessing and the reassessing.

14. The storage system of claim 1, wherein the disk drive performs internally the formatting of the disk surface or the assessing of the at least one operation of the read/write head of the disk drive, or both.

15. An apparatus comprising:
 a hardware controller to:
  assess at least one operation of a read/write head of a disk drive; and
  format, based at least in part on the assessing of the read/write head, a disk surface of the disk drive with a first servo zone, a second servo zone, and an overlap region extending between a start point of the second servo zone and an end point of the first servo zone, the overlap region starting towards a disk inner diameter (ID) and ending towards a disk outer diameter (OD), a width of the overlap region being based at least in part on a servo sector error rate of the read/write head determined by the assessing of the read/write head.

16. The apparatus of claim 15, wherein a start point of the first servo zone is towards the disk ID and the end point of the first servo zone is towards the disk OD, and wherein the start point of the second servo zone is towards the disk ID and an end point of the second servo zone is towards the disk OD.

17. The apparatus of claim 16, wherein a highest recording density in the first servo zone occurs at the start point of the first servo zone and gradually decreases over the first servo zone to a lowest recording density at the end point of the first servo zone; and wherein a highest recording density in the second servo zone occurs at the start point of the second servo zone and gradually decreases over the second servo zone to a lowest recording density at the end point of the second servo zone.

18. A method comprising:
 assessing at least one operation of a read/write head of a disk drive;
 formatting, based at least in part on the assessing of the read/write head, a disk surface of the disk drive with a first servo zone a second servo zone, and an overlap region extending between a start point of the second servo zone and an end point of the first servo zone, a start of the overlap region being towards an inner diameter (ID) of the disk surface, and an end of the overlap region being towards an outer diameter (OD) of the disk surface, the disk drive performing internally the formatting of the disk surface or the assessing of the at least one operation of the read/write head of the disk drive, or both, a width of the overlap region being based at least in part on a servo sector error rate of the read/write head determined by the assessing of the read/write head.

19. The method of claim 18, wherein a start point of the first servo zone is towards the disk ID and the end point of the first servo zone is towards the disk OD, and wherein the start point of the second servo zone is towards the disk ID and an end point of the second servo zone is towards the disk OD.

\* \* \* \* \*